(12) United States Patent
Paniogue et al.

(10) Patent No.: US 12,163,460 B2
(45) Date of Patent: Dec. 10, 2024

(54) ADDITIVELY MANUFACTURED ROTORS FOR SUPERCHARGERS AND EXPANDERS

(71) Applicant: EATON INTELLIGENT POWER LIMITED, Dublin (IE)

(72) Inventors: Tanille Jean Paniogue, Detroit, MI (US); Matthew James Fortini, Livonia, MI (US); Shravani Yerrabothu, Southfield, MI (US); Kevin Eric Portella, Royal Oak, MI (US); Michael John Froehlich, Farmington Hills, MI (US); Michael Lee Killian, Troy, MI (US)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 17/520,524

(22) Filed: Nov. 5, 2021

(65) Prior Publication Data

US 2022/0234106 A1 Jul. 28, 2022

Related U.S. Application Data

(63) Continuation of application No. 16/079,763, filed as application No. PCT/US2017/019461 on Feb. 24, 2017, now Pat. No. 11,167,351.

(Continued)

(51) Int. Cl.
*F02B 33/38* (2006.01)
*B22F 5/00* (2006.01)

(Continued)

(52) U.S. Cl.
CPC ............... *F02B 33/38* (2013.01); *B22F 5/009* (2013.01); *B22F 5/08* (2013.01); *B22F 5/10* (2013.01);

(Continued)

(58) Field of Classification Search
CPC .. F02B 33/38; B22F 5/009; F01C 1/16; F04C 18/16
See application file for complete search history.

(56) References Cited

U.S. PATENT DOCUMENTS 2,325,617 A * 7/1943 Lysholm ................. F01C 1/084
144/221
5,772,418 A * 6/1998 Tateno .................... F04C 18/16
418/206.5

(Continued)

FOREIGN PATENT DOCUMENTS

WO 2013/130774 A1 9/2013
WO 2013/148205 A1 10/2013

(Continued)

OTHER PUBLICATIONS

English Language Summary of China Office Action Corresponding to CN 201780023675.X dated Feb. 5, 2021.

(Continued)

*Primary Examiner* — Mary A Davis
(74) *Attorney, Agent, or Firm* — Merchant & Gould P.C.

(57) ABSTRACT

Rotors formed by an additive manufacturing process are presented. In one example, a rotor includes a monolithically formed rotor body and a plurality of helically arranged lobes formed from a first material, wherein each of the plurality of lobes defines an internal cavity between an outer surface and a central aperture.

21 Claims, 11 Drawing Sheets

Related U.S. Application Data (60) Provisional application No. 62/299,844, filed on Feb. 25, 2016.

(51) Int. Cl.
| | | |
|---|---|---|
| *B22F 5/08* | (2006.01) | |
| *B22F 5/10* | (2006.01) | |
| *B22F 7/06* | (2006.01) | |
| *B22F 7/08* | (2006.01) | |
| *B22F 10/12* | (2021.01) | |
| *B22F 10/18* | (2021.01) | |
| *B22F 10/25* | (2021.01) | |
| *B22F 10/28* | (2021.01) | |
| *B33Y 70/00* | (2020.01) | |
| *F01C 1/16* | (2006.01) | |
| *F04C 18/16* | (2006.01) | |
| *B22F 10/47* | (2021.01) | |
| *B22F 10/66* | (2021.01) | |
| *B33Y 10/00* | (2015.01) | |
| *B33Y 80/00* | (2015.01) | |

(52) U.S. Cl.
CPC .................. *B22F 7/06* (2013.01); *B22F 7/08* (2013.01); *B22F 10/12* (2021.01); *B22F 10/18* (2021.01); *B22F 10/25* (2021.01); *B22F 10/28* (2021.01); *B33Y 70/00* (2014.12); *F01C 1/16* (2013.01); *F04C 18/16* (2013.01); *B22F 2005/004* (2013.01); *B22F 10/47* (2021.01); *B22F 10/66* (2021.01); *B33Y 10/00* (2014.12); *B33Y 80/00* (2014.12); *F04C 2240/20* (2013.01); *F04C 2250/20* (2013.01); *F05C 2201/021* (2013.01); *F05C 2201/0448* (2013.01); *F05C 2201/046* (2013.01); *F05C 2251/00* (2013.01); *F05C 2251/10* (2013.01)

(56) References Cited

U.S. PATENT DOCUMENTS

| | | | |
|---|---|---|---|
| 6,688,867 | B2 | 2/2004 | Suman et al. |
| 7,488,164 | B2 | 2/2009 | Swartlander |
| 10,208,656 | B2 | 2/2019 | Pryor et al. |
| 10,514,036 | B2 * | 12/2019 | Brown ................... F02B 33/38 |
| 11,047,387 | B2 * | 6/2021 | Wu ........................ F04C 18/16 |
| 11,167,351 | B2 | 11/2021 | Paniogue et al. |
| 2008/0170958 | A1 * | 7/2008 | Prior ....................... F04C 18/16 |
| | | | 418/179 |
| 2009/0146519 | A1 | 6/2009 | Myojin |
| 2014/0260245 | A1 | 9/2014 | Eybergen |
| 2015/0064016 | A1 | 3/2015 | Cortequisse |
| 2015/0345298 | A1 | 12/2015 | Mongillo et al. |
| 2015/0354361 | A1 | 12/2015 | Hofer et al. |
| 2015/0360292 | A1 | 12/2015 | Kountanya et al. |
| 2016/0003248 | A1 | 1/2016 | Eybergen et al. |
| 2016/0082510 | A1 | 3/2016 | Chase et al. |
| 2017/0260981 | A1 | 9/2017 | Swartzlander |
| 2017/0304894 | A1 | 10/2017 | Buller |
| 2017/0342846 | A1 | 11/2017 | Chen et al. |
| 2018/0141127 | A1 | 5/2018 | Richard |
| 2018/0202293 | A1 | 7/2018 | Joshi et al. |
| 2020/0386113 | A1 | 12/2020 | Mardjono et al. |

FOREIGN PATENT DOCUMENTS

| | | | | |
|---|---|---|---|---|
| WO | 2014/090907 | A1 | 6/2014 | |
| WO | 2014/105113 | A1 | 7/2014 | |
| WO | 2014/107407 | A1 | 7/2014 | |
| WO | 2014/144701 | A1 | 9/2014 | |
| WO | WO-2014151057 | A2 * | 9/2014 | ............. F04C 18/16 |

OTHER PUBLICATIONS

International Search Report and Written Opinion of the International Searching Authority for International Patent Application No. PCT/US2017/019461 mailed May 10, 2017, 20 pages.

* cited by examiner

ADDITIVELY MANUFACTURED ROTORS FOR SUPERCHARGERS AND EXPANDERS

CROSS-REFERENCE TO RELATED APPLICATION

This application is a Continuation of U.S. patent application Ser. No. 16/079,763, filed on Aug. 24, 2018, now U.S. Pat. No. 11,167,351, which is a National Stage Application of PCT/US2017/019461, filed on Feb. 24, 2017, which claims the benefit of U.S. Patent Application Ser. No. 62/299,844, filed on Feb. 25, 2016, the disclosures of which are incorporated herein by reference in their entireties. To the extent appropriate, a claim of priority is made to each of the above disclosed applications.

TECHNICAL FIELD

This application relates to additively manufactured rotary components, such as Roots-type rotors for superchargers and expanders.

BACKGROUND

Various examples of Roots-type rotors for superchargers and expanders exist. In some applications, fluid temperatures necessitate the use of materials for the rotors that can withstand high temperatures. However, the use of such materials generally leads to rotors with a relatively high rotational inertia, as compared to rotors manufactured from materials that do not need to withstand high temperatures.

SUMMARY

Due to new applications of devices with rotary components (e.g. volumetric rotors or Roots-type rotors), such as WHR (waste heat recovery), ORC (organic Rankine cycle) and compound boosting with turbochargers feeding the supercharger inlet, higher temperature materials are required, lower inertia is desired to improve the transient response and different coefficients of thermal expansion are being investigated to maximize device efficiency. The materials that are able to perform at higher temperatures are typically higher density therefore we need a solution to lightweight rotors which is not cost prohibitive.

The teachings detailed in this disclosure are centered on the process of metal additive manufacturing for creating rotary components, such as rotors. Through the use of additive technology, formerly solid rotors can be developed in high temperature materials and hollowed out to reduce inertia. In addition to hollow rotors, the additive process allows for a lattice structure to be developed, which may allow an even thinner walled structure, thereby further reducing inertia. This invention also covers hollow or solid rotors that are printed directly onto a shaft. Another possibility covered in this invention is printing in multiple materials and printing on a coating, thereby avoiding any post processing of the rotor. The coating can also be the same material as the rotor, wherein the coating is applied at relatively higher porosity than the application for the rotor, thereby resulting in a lower density outer coating. Various portions of the rotor can be provided with differing material densities to account for different stresses at specific locations, thereby further reducing the inertia of the rotor.

Additional objects and advantages will be set forth in part in the description which follows, and in part will be obvious from the description, or may be learned by practice of the teachings presented herein. The objects and advantages will also be realized and attained by means of the elements and combinations particularly pointed out in the appended claims. It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Rotor Design

Referring to FIGS. 1-9, a rotor 100 is shown that is produced by a 3D printing or additive manufacturing process such that a net shape or near net shape rotor is produced. The particular additive manufacturing approach utilized to produce the rotor 100 may be any of a variety of processes known in the art, such as selective laser sintering, selective laser melting, stereolithography, coaxial powder feeding, and wire feeding and fused deposition modeling. Powder-based deposition methods (powder bed or powder-fed) using laser or electron beam melting are useful. A variety of materials can be utilized to form the rotor, for example steel (e.g. 316L stainless steel) or aluminum (e.g. 1060 series aluminum). In one approach, the rotor 100 is formed in layers starting from a base end and continuing until the rotor is fully formed at an opposite end. An advantage of forming the rotor 100 with an additive manufacturing process is that the rotor 100 can be formed with internal cavities or voids such that the rotor is hollow with reduced mass and rotational inertia. Such a construction allows for a rotor 100 to be manufactured to the same size and shape but with reduced material, thus increasing performance over a solid rotor made from the same material. Such a construction also allows for the creation of a hollow rotor 100 formed from stainless steel that has the same or less rotational mass than a similarly sized solid aluminum rotor. Thus, a rotor 100 can be formed via an additive manufacturing process that has improved performance characteristics and that is also suitable for use in higher temperature applications, in comparison to a solid aluminum rotor. In some variations, the cavities or voids are filled with a second, different material, such as epoxy, after the rotor 100 has been fully formed from the first material. Where the fill material has a lower density than the material from which the rotor 100 is formed, a solid rotor 100 can be achieved that has reduced mass and rotational inertia in comparison to a solid rotor formed from only the first material.

As shown, the rotor 100 extends from a first end 108 to a second end 110. A first end face 112 is provided at the first end 108 while a second end face 114 is provided at the second end 110. A plurality of twisted or helically arranged lobes 102 extend between the first and second end faces 112, 114. The lobes 102 can be alternatively provided as straight lobes and can be provided in numbers other than three lobes, for example, four lobes may be provided. As most easily viewed at FIGS. 3, 6, and 7, each of the lobes 102 is provided with an interior cavity 120 extending the majority of the length between the first and second end faces 112, 114. As shown, the interior cavity extends between a first end 120a and a second end 120b. The interior cavity 120 of each lobe 102 results in the lobe 102 having a wall 102a with a resulting wall thickness T102a which can either be constant or varying. In one example, the wall thickness T102a of the lobes 102 is greater near the inner root portion of the lobes 120 than at the outer tip portion of the lobes 120.

Figure 1:
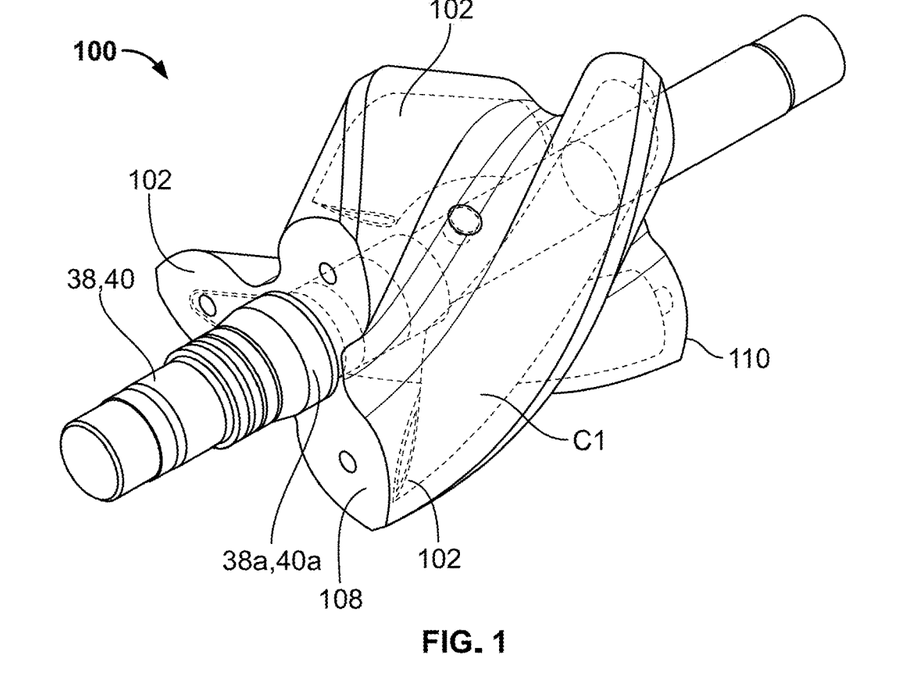
FIG. 1 is a schematic perspective view of a hollow steel rotor formed by an additive manufacturing process that is mounted to a shaft, which is an example in accordance with aspects of the invention.
Figure 2:
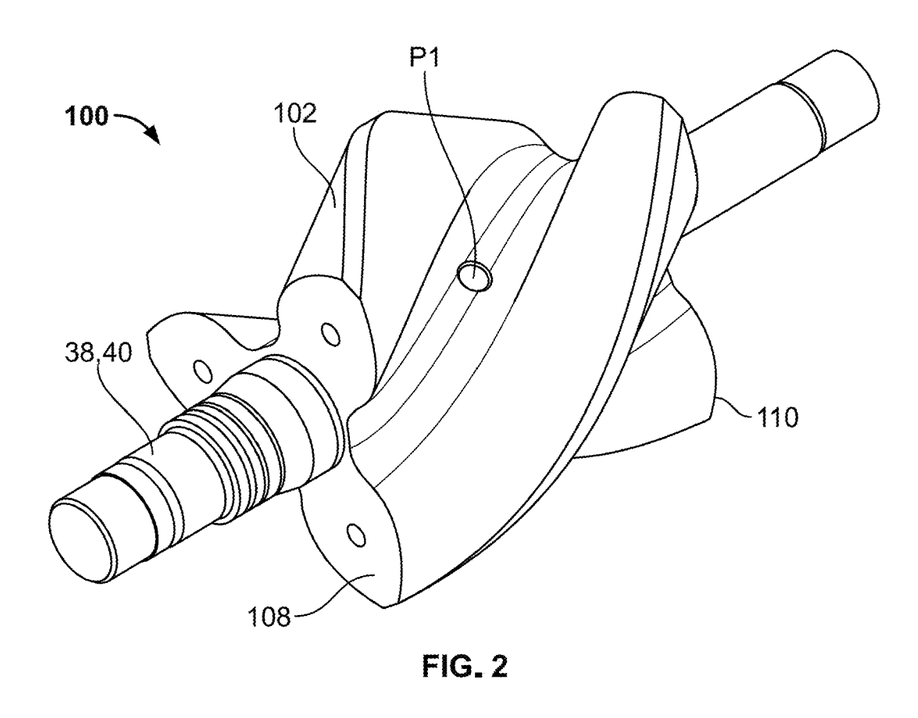
FIG. 2 is a schematic perspective view of the rotor shown in FIG. 1 with an outer coating of the rotor not shown.
Figures 3, 4, 5:
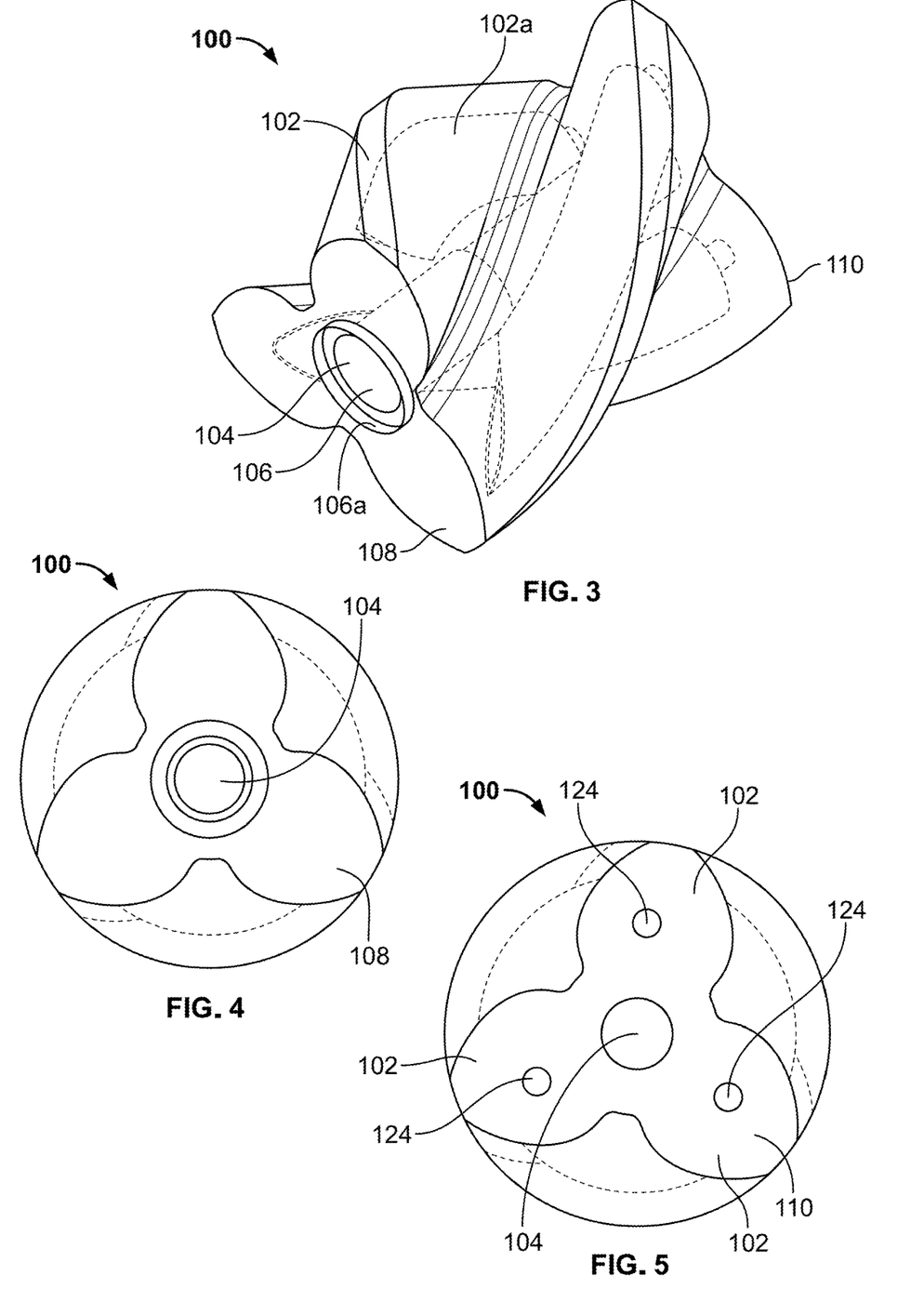
FIG. 3 is a schematic perspective view of the rotor shown in FIG. 1 removed from the shaft.
FIG. 4 is a schematic end view of the rotor shown in FIG. 1.
FIG. 5 is a schematic end view of the rotor shown in FIG. 1.
Figure 6:
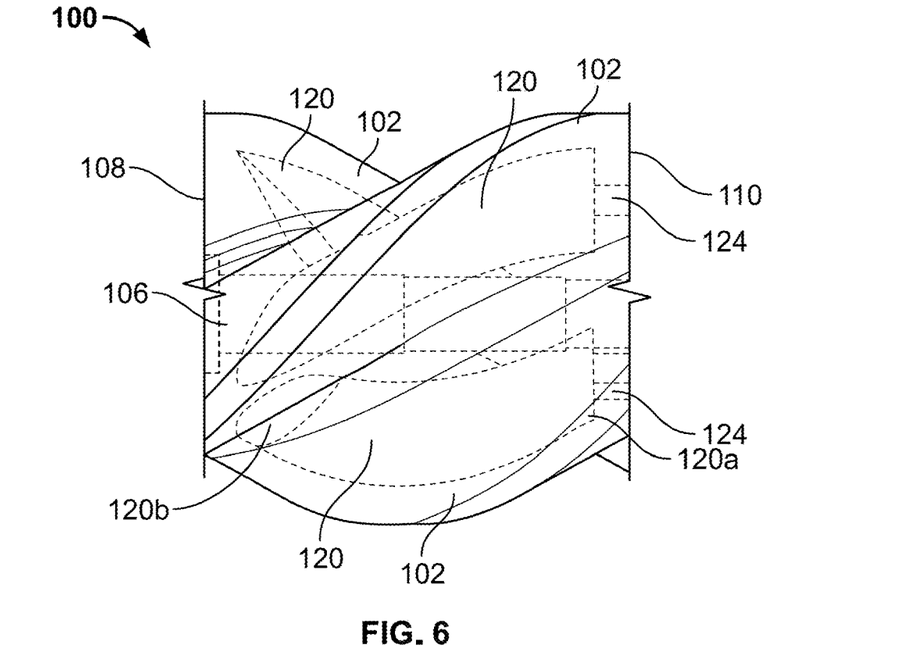
FIG. 6 is a schematic side view of the rotor shown in FIG. 1.
Figure 7:
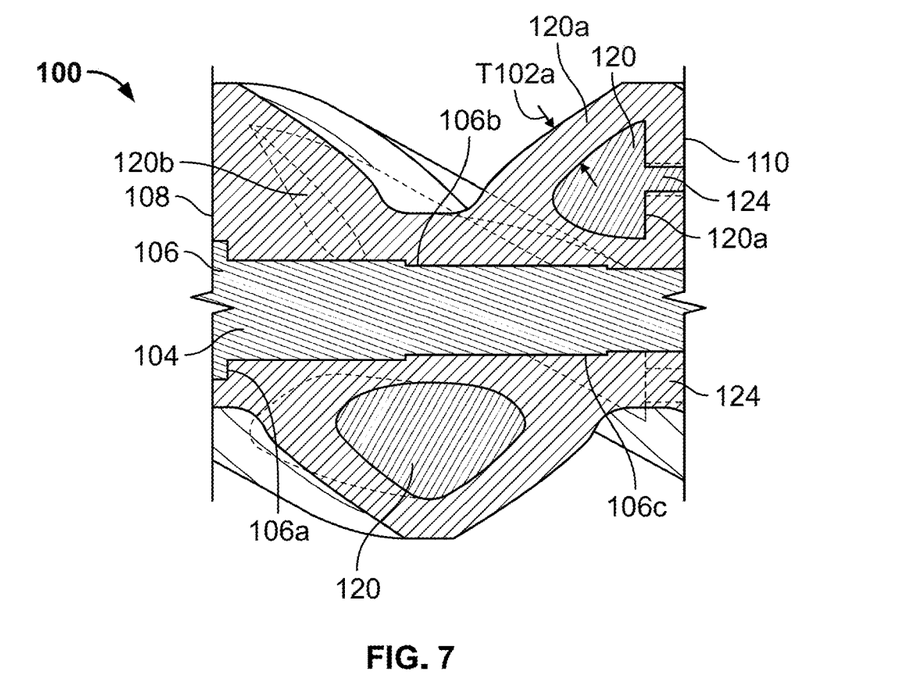
FIG. 7 is a schematic cross-sectional side view of the rotor shown in FIG. 6.

In one aspect, the rotor lobes 102 are arranged around a central aperture 104 through which a shaft 38, 40 can extend. FIGS. 1 and 2 show the rotor 100 mounted to the shaft 38, 40 while FIGS. 3 to 8 show view of the rotor 100 removed from the shaft 38, 40. The central aperture 104 is defined by a tubular section 106 that is also hollow. In one example, the tubular section 106 is provided with a minimum wall thickness of about 3 mm at an interior wall 102b. In the embodiment shown, the tubular section 106 includes a stepped portion 106a for receiving a shoulder portion 38a, 40a of the shaft 38, 40. The tubular section 106 can also be provided with second and third stepped portions 106b, 106c, as shown at FIG. 7, for further engaging additional shoulder portions of the shaft 38, 40. The tubular section 106 can be entirely formed by the additive manufacturing process or can be initially formed with the additive manufacturing process and then finally formed with a machining step, such as with a boring step. The tubular section 106 can be pressed onto the shaft 38, 40 or can be utilized as the shaft itself when formed as a hollow tube with additional material extending beyond the first and second faces 112, 114. Alternatively, the tubular section 106 can instead be formed as a solid shaft such that shaft 38, 40 is an integrally formed portion of the rotor 100. The integrally formed shaft 38, 40 can extend through the entire length of the rotor or could be formed such that only stubs extending from the ends of the rotor are present.

Figure 8:
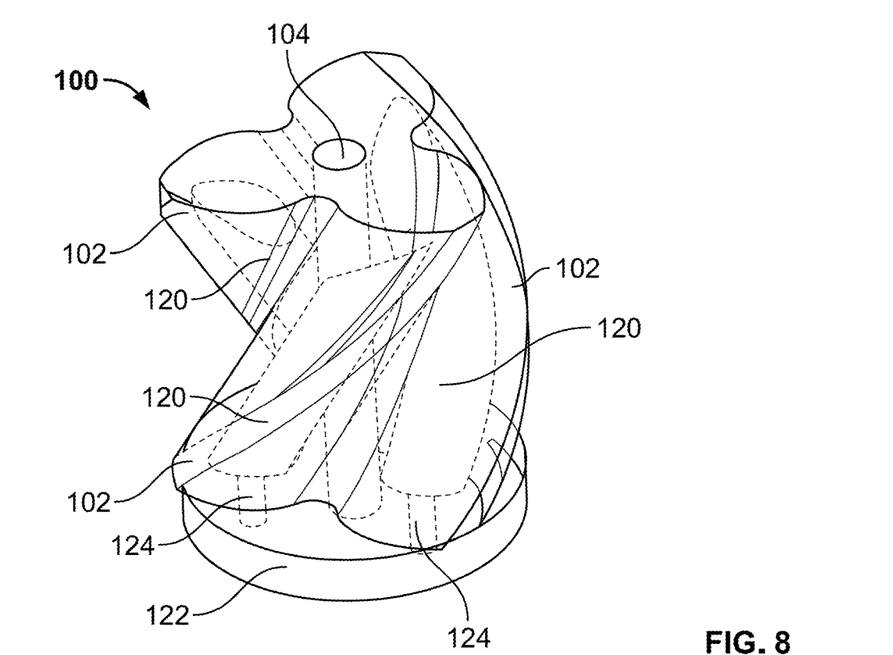
FIG. 8 is a schematic perspective view of the rotor shown in FIG. 1 in a pre-finished condition and illustrating a preferred manufacturing approach.
Figure 9:
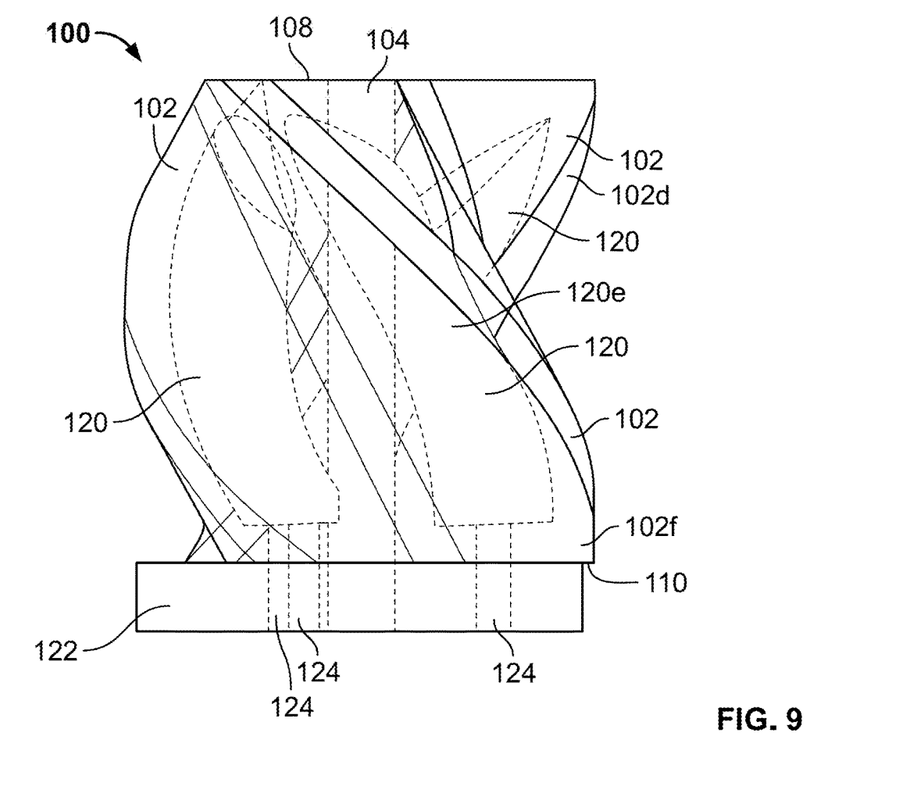
FIG. 9 is a schematic side view of the pre-finished rotor shown in FIG. 8.

When producing the rotor 100, the additive manufacturing process begins at the second end 110 and continues to completion at the first end 108. In one example, a base 122 is first created, as shown at FIGS. 8 and 9. In one example, the base 122 is cylindrical and is formed at a thickness of about 10 mm (millimeters). The base 122 is used to hold the printed rotor 100 while machining and/or coating the rotor after the rotor 100 has been fully formed. After these steps are completed, the base 122 can be cut off or machined from the rest of the rotor to form the final end face 110 of the rotor. The end of the cylindrical base 122 facing the first end face 108 will form the second end face 110 of the rotor 100. In one example, the base 122 and the end face 110 may be provided with ream holes 124 to allow powder to be removed that is entrapped within or falls into the cavities 120 during the additive manufacturing process. In one example, the ream holes 124 are about 5 mm in diameter. The ream holes can be filled with material matching that of the rotor 100 or the surface coating C1 after the rotor 100 has been completely formed. The ream holes 124 can also be left open. The ream holes 124 can be used as location or mounting features during subsequent machining of the rotor 100. In one alternative approach, the rotor 100 is printed onto a pre-formed shaft 38, 40.

Figure 10:
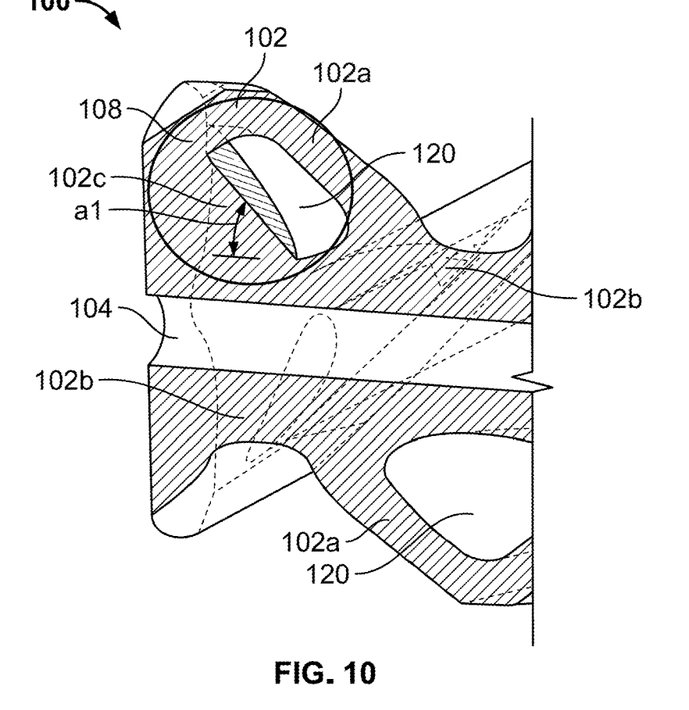
FIG. 10 is a cross-sectional view of an end portion of the pre-finished rotor shown in FIG. 8.
Figure 11:
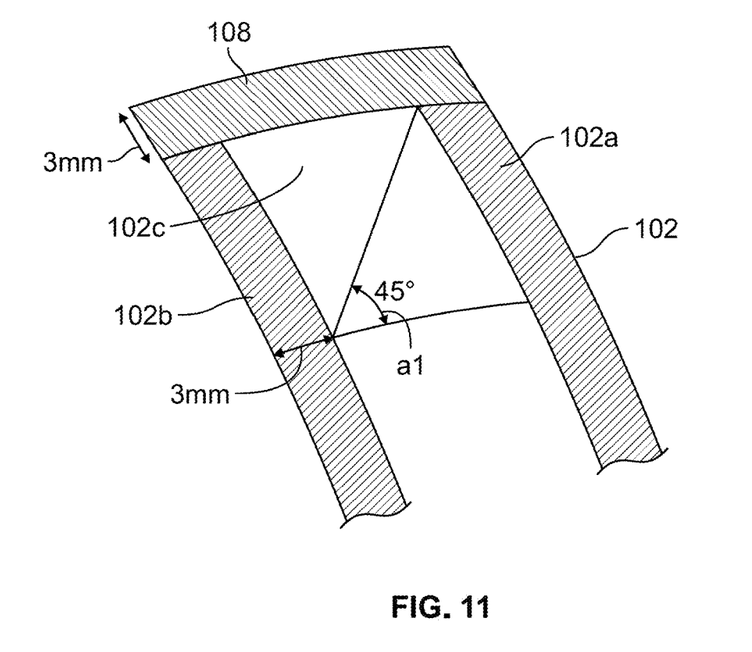
FIG. 11 is a schematic cross-sectional side view of a lobe of the rotor shown in FIG. 10.

As material is added to build the rotor 110 up from the base 122 and towards the end face 108, the end face 108 itself can be formed as an integral, self-supported cap. This can be accomplished by gradually building material, which may be referred to as a bridge portion 102c, into each cavity 120 from the outer wall 102a or the root/inner portion 102b of the rotor 100. Material can be built up from both the inner and outer walls 102a, 102b as well. Referring to FIGS. 10 and 11, it can be seen that the bridge portion 102c can be built up at an angle a1 with respect to the wall(s) 120a, 120b (and longitudinal axis of the rotor 100) with added material until the cavity 120 is completely closed off and such that an end cap is formed. The angle a1 can be between 30 to 60 degrees, and is preferably about 45 degrees. At this point, each cavity 120 has a tapered end proximate the end face 108 and is entirely enclosed with the exception of the ream holes 124. In the example shown, the end faces 108 and 110 have a wall thickness of about 3 mm beyond the enclosed cavity 120. Once the process is complete, the rotor 100 is formed as a monolithic structure having internal cavities within the lobes. In an alternative design, the rotor 100 is formed without the end caps defining the end faces 108, 110 and separate end caps are attached to the rotor 100 after the rotor has been printed.

In one example, the rotor 100 can be formed from different materials at different sections of the rotor 100. Referring to FIG. 9, the rotor can be printed by adding the first and second materials in a printing order, wherein the first material is printed to form a first end section 102d of the rotor, a second, different material is printed to form a middle section 102e, and the first material is again printed to form a second end section 102f. The sections 102d, 102e, 102f are schematically shown as being separated by dashed lines on FIG. 9. The first and second materials can be can be any materials capable of being bonded together via an additive manufacturing process. In other examples, the portion of the rotor 100 nearest the central aperture 104 (e.g. the root portions of the lobes) is printed with the first material and the outer portions of the rotor 100 (e.g. the tip portions of the lobes) are printed with the second material.

The rotor 100 shown at FIG. 1 is provided with an outer coating or layer C1, such as an abradable coating formed from an epoxy and graphite mixture. This coating can be applied via printing/additive manufacturing or can be applied via another process, such as electrostatic spraying. Printing the coating onto the rotor would eliminate the need for a conventional coating process, thereby reducing at least two steps in the entire production process: the finish machining operation and the coating operation. Such a step can represent a significant reduction in required capital machines to produce a rotor. In one example, the coating can be printed using the same material as the base rotor material. This would be done in a similar fashion to porous coated hips, after the rotor base is printed the exterior coating would be printed in a sparse matrix leaving a porous coating. There is concern that similar materials could lead to galling which leads to the next option of multi-material. The coating could potentially be printed with a softer or more abradable material. This would be accomplished by using a multi-material printing method. Powder bed technology or coaxial powder feed to print different materials together in a single block may be utilized.

FIG. 2 shows the rotor 100 without the coating C1 where it can be seen that a pin P1 is provided. Pin P1 extends through the rotor 100 and into the shaft 38, 40 and ensures that the rotor 100 cannot rotate relative to the shaft 38, 40. During assembly, the rotor 100 can be press fit onto the shaft 38, 40 until the stepped portions 106a, 106b, and/or 106c fully seat on the shoulder portions (e.g. 38a, 40a) of the shaft 38, 40. Once seated, a hole can be drilled through the rotor 100 and shaft 38, 40 and the pin can be press fit into the hole. In one example, the rotor 100 is provided with surface machining at the end faces 112, 114 and the lobes 102 either before or after being mounted onto the shaft 38, 40, although it is preferred to conduct such machining before the pin P1 is inserted. In one example, this machining step is performed with a 3 mm (millimeter) machining allowance with an additional about 5 mm added for coating purposes. After insertion of the pin P1, the layer or coating C1 can be applied which can then be followed by a final machining step. As noted above, the coating C1 can be printed onto the rotor outer surface instead of performing machining and coating steps.

Figure 12:
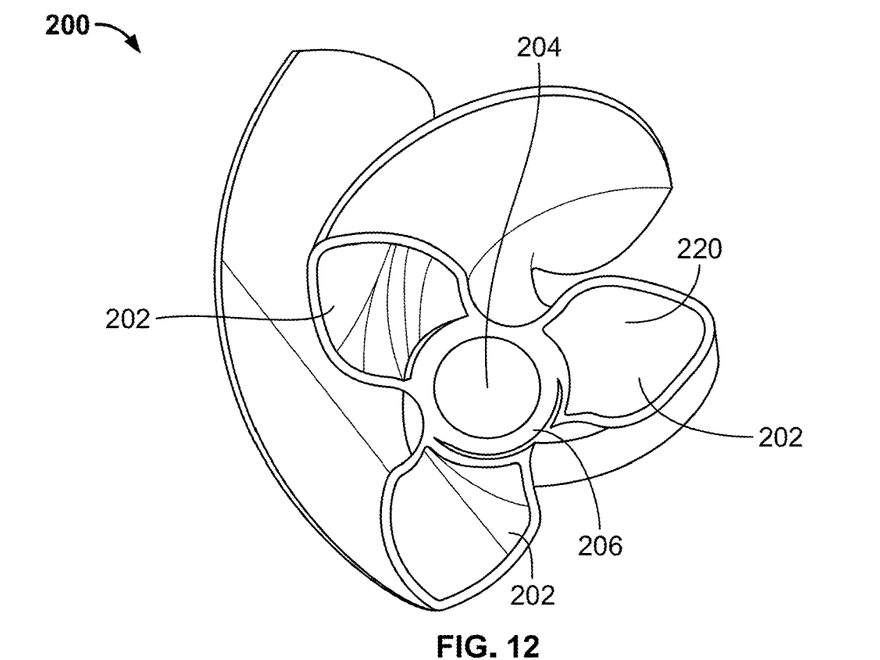
FIG. 12 is a schematic perspective view of a thin-walled hollow steel rotor formed by an additive manufacturing process, which is an example in accordance with aspects of the invention.
Figure 16:
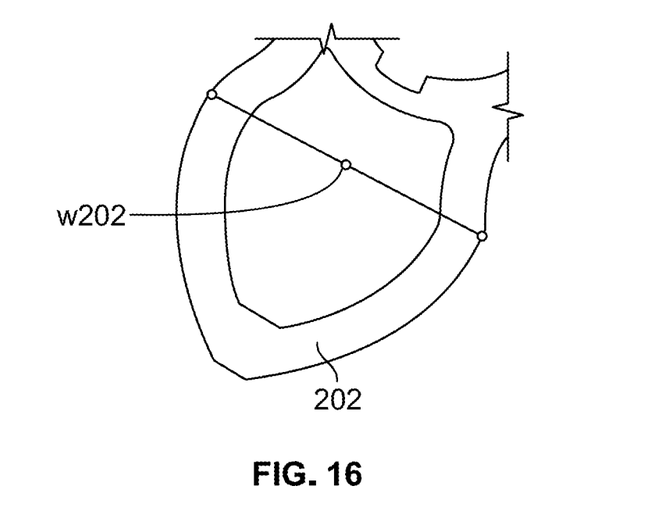
FIG. 16 is a schematic cross-sectional view of an example thin-walled rotor showing a maximum rotor dimension.
Figure 17:
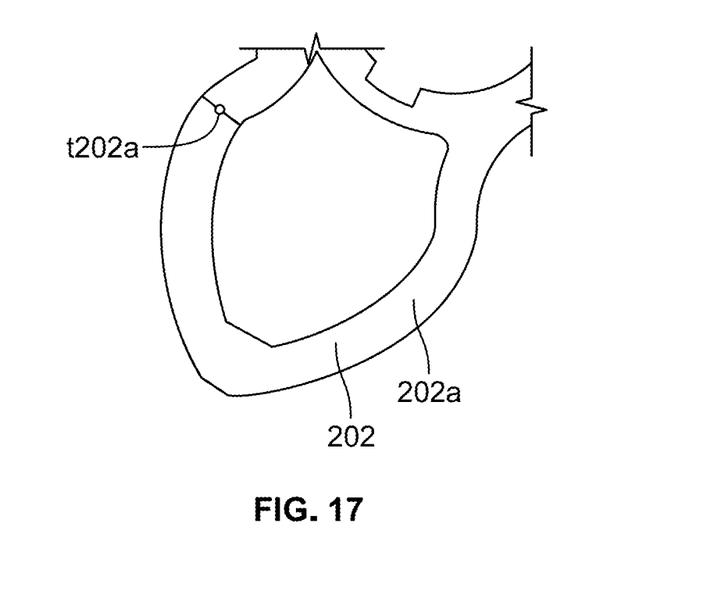
FIG. 17 is a schematic cross-sectional view of the thin-walled rotor shown in FIG. 19 showing a wall thickness.

Referring to FIG. 12, an alternative design rotor 200 is shown that is produced by a 3D printing or additive manufacturing process. As shown, the rotor 200 includes a plurality of lobes 202 that are hollow and define an interior cavity 220. The lobes 202 are arranged around a central aperture 204. The central aperture 204 is defined by a tubular section 206 that is also hollow. The tubular section 206 can be pressed onto a shaft or can be utilized as the shaft itself. Alternatively, the tubular section 206 can be a solid shaft. Separate end caps, formed from a metal sheet or from an additive manufacturing process, can be attached to the ends of the rotor 200. As with rotor 100, rotor 200 has hollow lobes 102 and thus less rotational inertia compared to a solid rotor formed from the same material. At a given wall thickness, the hollow 316L Stainless Steel rotor 200 will have less inertia than a solid 1060 Aluminum solid rotor. FIGS. 16 and 17 show an example of a thin-walled hollow rotor lobe 202, wherein the wall thickness t202a is less than 15 percent of the maximum width w202 of the rotor (i.e. 3 mm/20.55 mm=14.5%). A mass property analysis shows that a stainless steel hollow rotor 200 can be provided with less mass than a similarly shaped solid aluminum rotor (e.g. ~252 grams for rotor 200 vs. ~285 grams for a solid aluminum rotor). The same analysis shows that a stainless steel hollow rotor 200 can have lower principle moments of inertia than a solid aluminum rotor. In one example, the hollow portions of the lobes can be filled with a second material, such as a resin and/or foam material. These characteristics are fully applicable to the rotor 100 as well.

Figure 13:
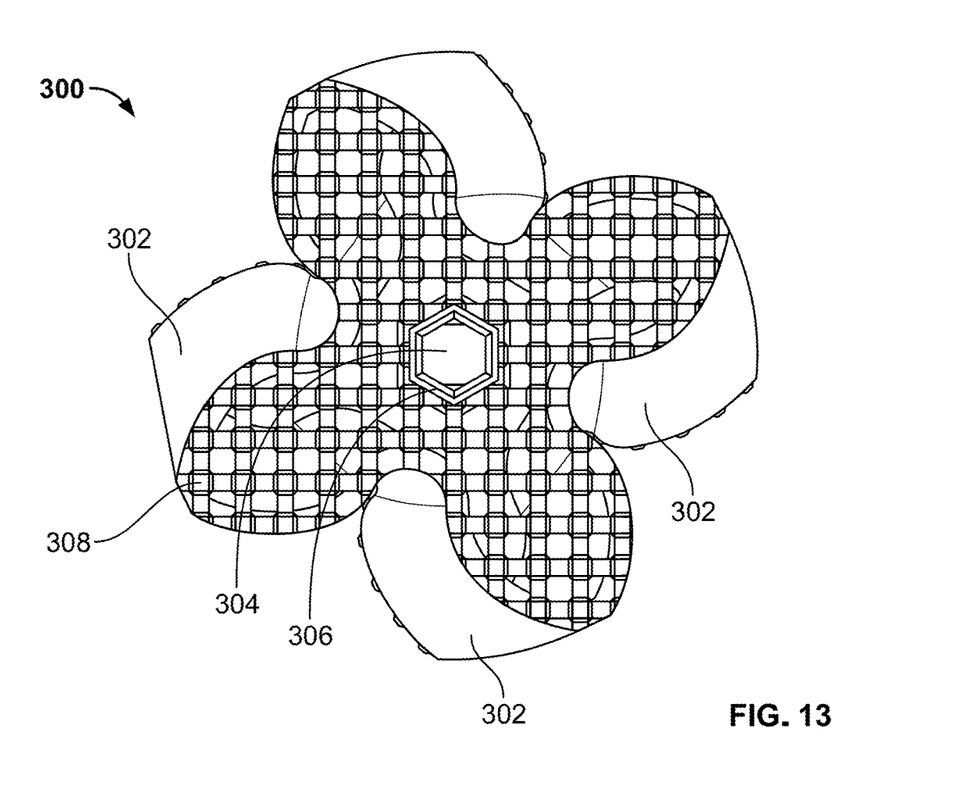
FIG. 13 is a schematic perspective view of a thin-walled rotor formed by an additive manufacturing process having an internal lattice structure, which is an example in accordance with aspects of the invention.
Figure 15:
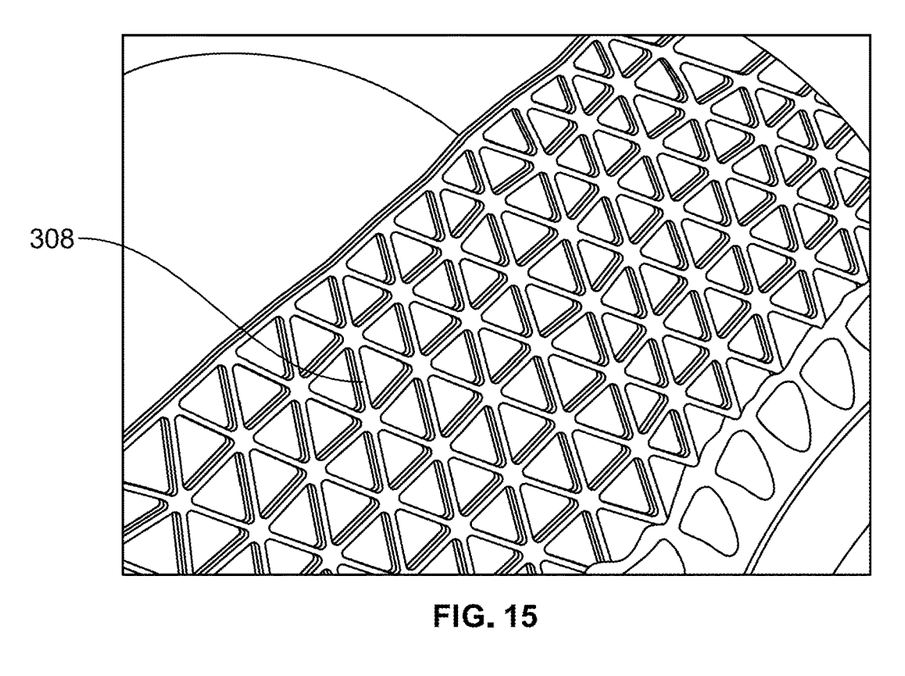
FIG. 15 is a schematic perspective view of a printed lattice structure usable with the rotors shown in FIGS. 12 to 14.

Referring to FIG. 13, a rotor 300 is shown that is produced by a 3D printing or additive manufacturing process. The rotor 300 is similar to the rotors 100 and 200, but is also provided with a 3D printed or additively manufactured supporting lattice structure 308. This lattice structure can be integrated into any of the disclosed rotor designs (e.g. rotors 100, 200, 400). The internal lattice structure 308 can allow for an even thinner walled rotor to be utilized. An internal lattice structure 308 may also provide a matrix by which one could potentially fill the rotor with a foam or polymer to reduce noise. Considerations when designing an appropriate lattice structure are: print orientation, ability of certain lattice structure designs to be printed, and minimum thickness of the lattice itself to ensure it is printable. One suitable lattice structure design for printing of the lattice structure 308 is shown at FIG. 15. The lattice structure is beneficial in providing structural integrity to the rotor while providing for an internal structure that has a lower density than a solid material. In one aspect, the lattice structure can be referred to as a low density structure, meaning that the density of the structure is lower than that of an entirely solid filled structure.

Figure 14:
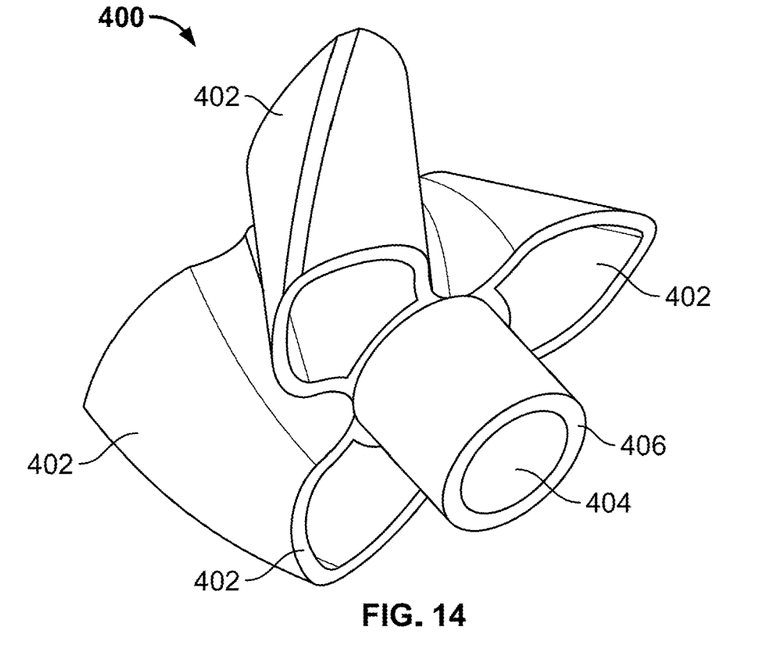
FIG. 14 is a schematic perspective view of a thin-walled rotor formed by an additive manufacturing process, wherein the rotor has been printed directly onto a shaft, which is an example in accordance with aspects of the invention.

Referring to FIG. 14, a rotor 400 is shown that is also produced by a 3D printing or additive manufacturing process. The rotor 400 of FIG. 14 includes a shaft 406 that is also printed concurrently with the rotor lobes 402. In the case of either a hollow or lattice structure rotor printing directly onto the shaft 406, total time to reach a final part can be reduced. Printing directly onto the shaft 406 would eliminate the need to finish machine the bore and press onto a shaft. If the shaft 406 is integrated into the rotor it is possible to hollow out the shaft to form a central aperture 404, or only print onto partial shafts at the ends of the rotor, as is shown in FIG. 14. This features of this design can be fully integrated into the other disclose rotor designs (e.g. rotors 100, 200, 300).

Rotary Assembly Applications

Figure 18:
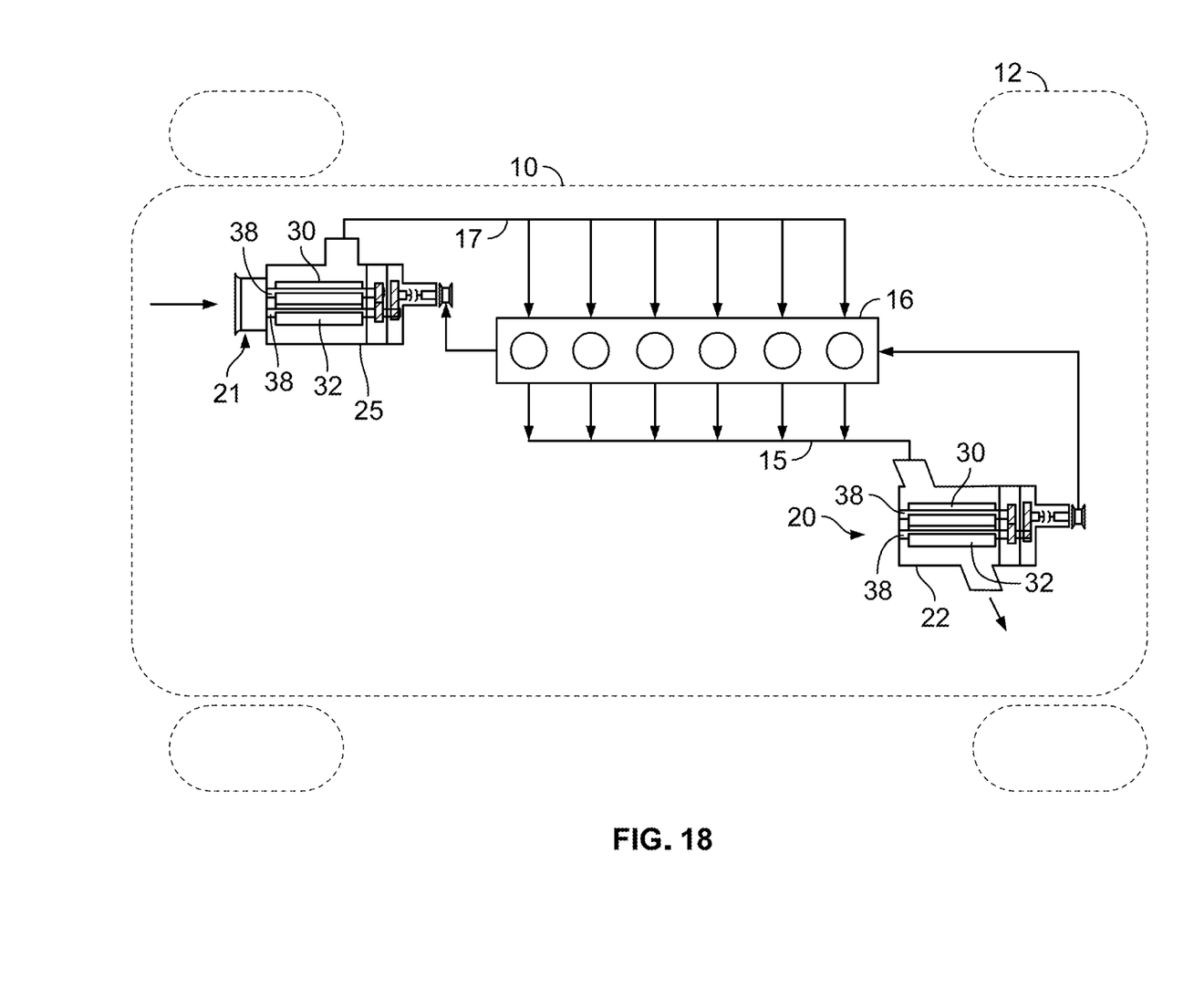
FIG. 18 is a schematic view of a vehicle having a fluid expander and a compressor in which rotor assemblies of the types shown in FIGS. 1 and 12 to 14 may be included.

The above described rotors 100, 200, 300, 400 (collectively rotor assembly 30) may be used in a variety of applications involving rotary devices. Two such applications can be for use in a fluid expander 20 and a compression device 21 (e.g. a supercharger), as shown in FIG. 18. In one example, the fluid expander 20 and compression device 21 are volumetric devices in which the fluid within the expander 20 and compression device 21 is transported across the rotors 30 without a change in volume. FIG. 18 shows the expander 20 and supercharger 21 being provided in a vehicle 10 having wheels 12 for movement along an appropriate road surface. The vehicle 10 includes a power plant 16 that receives intake air 17 and generates waste heat in the form of a high-temperature exhaust gas in exhaust 15. In one example, the power plant 16 is a fuel cell. The rotor assembly 30, 430 may also be used as a straight or helical gear (i.e. a rotary component) in a gear train, as a transmission gear, as a rotor in other types of expansion and compression devices, as an impeller in pumps, and as a rotor in mixing devices.

As shown in FIG. 18, the expander 20 can receive heat from the power plant exhaust 15 and can convert the heat into useful work which can be delivered back to the power plant 16 (electrically and/or mechanically) to increase the overall operating efficiency of the power plant. As configured, the expander 20 can include housing 22 within which a pair of rotor assemblies 30, 32 is disposed. The expander 20 having rotor assemblies 30, 32 can be configured to receive heat from the power plant 16 directly or indirectly from the exhaust.

One example of a fluid expander 20 that directly receives exhaust gases from the power plant 16 is disclosed in Patent Cooperation Treaty (PCT) International Application Number PCT/US2013/078037 entitled EXHAUST GAS ENERGY RECOVERY SYSTEM. PCT/US2013/078037 is herein incorporated by reference in its entirety.

One example of a fluid expander 20 that indirectly receives heat from the power plant exhaust via an organic Rankine cycle is disclosed in Patent Cooperation Treaty (PCT) International Application Publication Number WO 2013/130774 entitled VOLUMETRIC ENERGY RECOVERY DEVICE AND SYSTEMS. WO 2013/130774 is incorporated herein by reference in its entirety.

Still referring to FIG. 18, the compression device 21 can be shown provided with housing 25 within which a pair of rotor assemblies 30, 32 is disposed. As configured, the compression device can be driven by the power plant 16. As configured, the compression device 21 can increase the amount of intake air 17 delivered to the power plant 16. In one example, compression device 21 can be a Roots-type blower or supercharger of the type shown and described in U.S. Pat. No. 7,488,164 entitled OPTIMIZED HELIX ANGLE ROTORS FOR ROOTS-STYLE SUPERCHARGER. U.S. Pat. No. 7,488,164 is hereby incorporated by reference in its entirety. An additional example is provided at Patent Cooperation Treaty (PCT) International Publication Number WO 2013/148205, the entirety of which is incorporated herein by reference.

Figure 19:
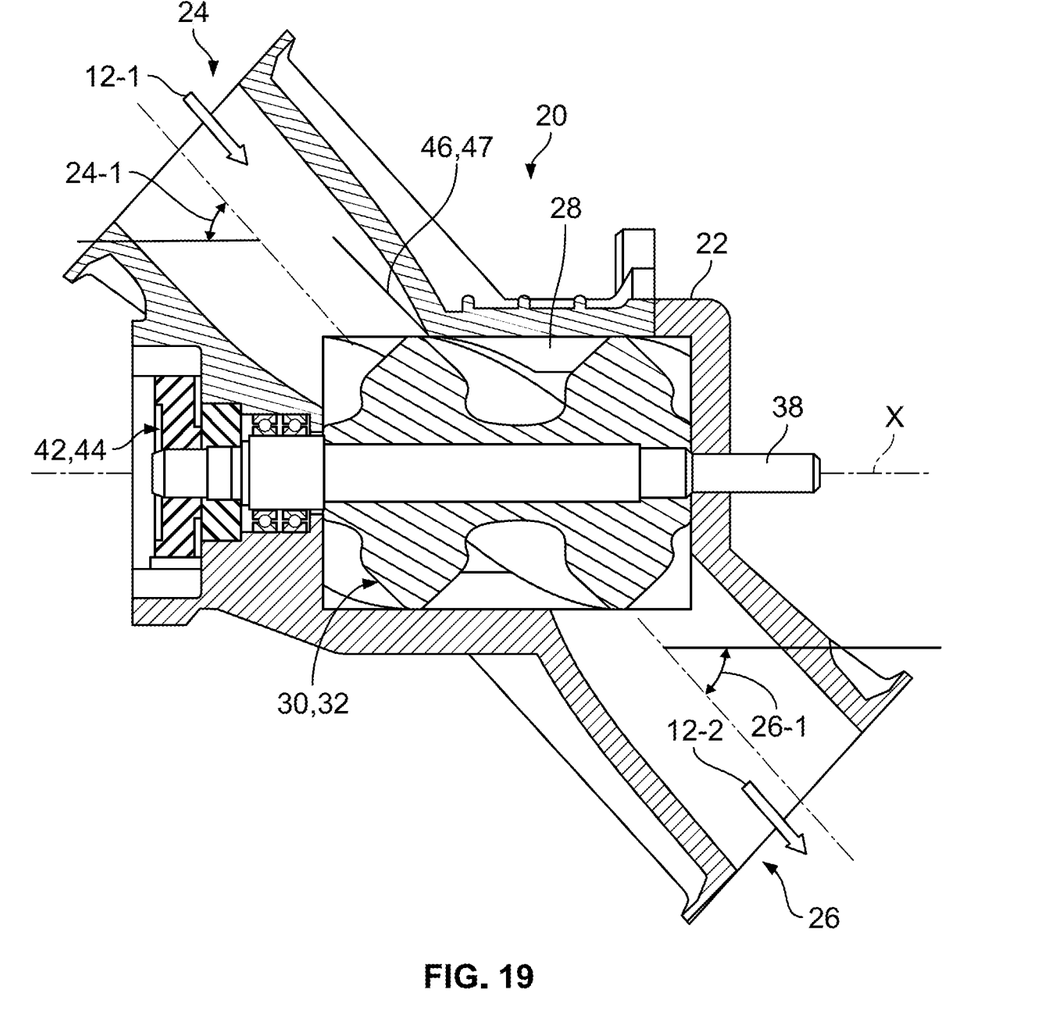
FIG. 19 is a schematic side view of an expander within which any of the rotors shown in FIGS. 1 and 12 to 14 can be used.
Figure 20:
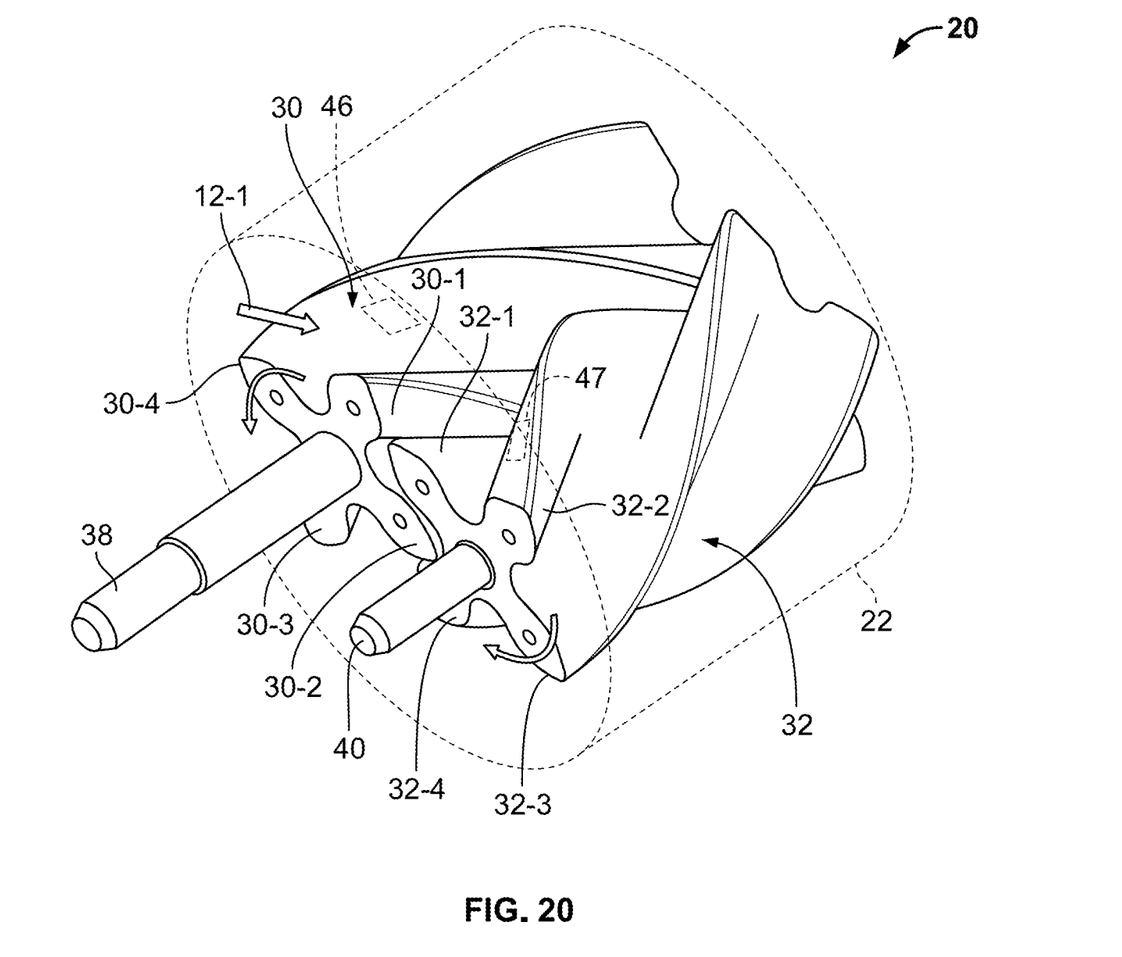
FIG. 20 is a schematic perspective view of the expander shown in FIG. 19.

Referring to FIGS. 19 and 20, further aspects of the waste heat recovery device or expander 20 are shown. While some details of the expander 20 are discussed in this subsection and above, additional structural and operational aspects can be found in Patent Cooperation Treaty (PCT) International Publication Number WO 2014/144701 and in United States Patent Application Publication US 2014/0260245, the entireties of which are incorporated herein by reference.

In general, the volumetric energy recovery device or expander 20 relies upon the kinetic energy and static pressure of a working fluid to rotate an output shaft 38. The expander 20 may be an energy recovery device 20 wherein the working fluid 12-1 is the direct engine exhaust from the engine. In such instances, device 20 may be referred to as an expander or expander, as so presented in the following paragraphs.

With continued reference to FIGS. 19 and 20, it can be seen that the expander 20 has a housing 22 with a fluid inlet 24 and a fluid outlet 26 through which the working fluid 12-1 undergoes a pressure drop to transfer energy to the output shaft 38. The output shaft 38 is driven by synchronously connected first and second interleaved counter-rotating rotors 30, 32 which are disposed in a cavity 28 of the housing 22. Each of the rotors 30, 32 has lobes that are twisted or helically disposed along the length of the rotors 30, 32. Upon rotation of the rotors 30, 32, the lobes at least partially seal the working fluid 12-1 against an interior side of the housing at which point expansion of the working fluid 12-1 only occurs to the extent allowed by leakage which represents and inefficiency in the system. In contrast to some expanders that change the volume of the working fluid when the fluid is sealed, the volume defined between the lobes and the interior side of the housing 22 of device 20 is constant as the working fluid 12-1 traverses the length of the rotors 30, 32. Accordingly, the expander 20 may be referred to as a "volumetric device" as the sealed or partially sealed working fluid volume does not change.

The expander 20 includes a housing 22. As shown in FIG. 19, the housing 22 includes an inlet port 24 configured to admit relatively high-pressure working fluid 12-1. The housing 22 also includes an outlet port 26.

As additionally shown in FIG. 20, each rotor 30, 32 has four lobes, 30-1, 30-2, 30-3, and 30-4 in the case of the rotor 30, and 32-1, 32-2, 32-3, and 32-4 in the case of the rotor 32. Although four lobes are shown for each rotor 30 and 32, each of the two rotors may have any number of lobes that is equal to or greater than two, as long as the number of lobes is the same for both rotors. For example, the rotors shown at FIGS. 1 and 12 each have three lobes. When one lobe of the rotor 30, such as the lobe 30-1 is leading with respect to the inlet port 24, a lobe of the rotor 32, such as the lobe 30-2, is trailing with respect to the inlet port 24, and, therefore with respect to a stream of the high-pressure working fluid 12-1.

As shown, the first and second rotors 30 and 32 are fixed to respective rotor shafts, the first rotor being fixed to an output shaft 38 and the second rotor being fixed to a shaft 40. Each of the rotor shafts 38, 40 is mounted for rotation on a set of bearings (not shown) about an axis X1, X2, respectively. It is noted that axes X1 and X2 are generally parallel to each other. The first and second rotors 30 and 32 are interleaved and continuously meshed for unitary rotation with each other. With renewed reference to FIG. 19, the expander 20 also includes meshed timing gears 42 and 44, wherein the timing gear 42 is fixed for rotation with the rotor 30, while the timing gear 44 is fixed for rotation with the rotor 32. The timing gears 42, 44 are configured to retain specified position of the rotors 30, 32 and prevent contact between the rotors during operation of the expander 20.

The output shaft 38 is rotated by the working fluid 12 as the working fluid undergoes expansion from the relatively high-pressure working fluid 12-1 to the relatively low-pressure working fluid 12-2. As may additionally be seen in both FIGS. 19 and 20, the output shaft 38 extends beyond the boundary of the housing 22. Accordingly, the output shaft 38 is configured to capture the work or power generated by the expander 20 during the expansion of the working fluid 12 that takes place in the rotor cavity 28 between the inlet port 24 and the outlet port 26 and transfer such work as output torque from the expander 20. Although the output shaft 38 is shown as being operatively connected to the first rotor 30, in the alternative the output shaft 38 may be operatively connected to the second rotor 32. In one aspect, the expander 20 can also be operated as a high volumetric efficiency positive displacement pump when driven by the motor/generator 70.

Other implementations will be apparent to those skilled in the art from consideration of the specification and practice of the examples and teachings presented herein. It is intended that the specification and examples be considered as exemplary only, with the true scope of the invention being indicated by the following claims.

What is claimed is:

1. A rotor comprising:
    (a) a monolithically formed rotor body defining:
        1) a central aperture;
        2) a plurality of lobes arranged helically about the central aperture and being formed from a first material, each of the plurality of lobes defining an internal cavity between an outer surface and the central aperture;
        3) a lattice structure within the internal cavity of each of the plurality of lobes; and
        4) an injected foam or polymer within the lattice structure.

2. The rotor of claim 1, further including a shaft extending through the central aperture, wherein the shaft is formed from a metal material and the first material is a metal material.

3. The rotor of claim 2, wherein the shaft and the plurality of lobes are formed by one of selective laser sintering, selective laser melting, stereolithography, fused deposition modeling coaxial powder feeding, and wire feeding.

4. The rotor of claim 2, wherein the shaft extends through the central aperture along an axial length.

5. The rotor of claim 2, wherein the shaft has a first end part and a second end part, each of which has a length that is less than a length of the plurality of lobes.

6. The rotor of claim 1, wherein the first material is one or more of a steel, a stainless steel, and an aluminum alloy.

7. The rotor of claim 6, wherein the first material is 316L stainless steel.

8. The rotor of claim 1, wherein each of the plurality of lobes has an inner surface and has a wall thickness extending between the inner and outer surfaces of 3 millimeters.

9. The rotor of claim 1, wherein the plurality of lobes is formed by one of selective laser sintering, selective laser melting, stereolithography, fused deposition modeling coaxial powder feeding, and wire feeding.

10. The rotor of claim 1, further comprising a coating formed by adding a second material onto the outer surface of the plurality of lobes.

11. The rotor of claim 10, wherein the second material is different from the first material.

12. The rotor of claim 10, wherein the second material is the same as the first material.

13. The rotor of claim 10, wherein the second material is provided at a second material porosity that is higher than a first material porosity at which the first material is added.

14. The rotor of claim 10, wherein the second material is provided in a matrix pattern onto the outer surface of the plurality of lobes.

15. The rotor of claim 10, wherein the second material has a lower hardness and abradability than that of the first material.

16. The rotor of claim 1, further including a shaft integrally formed with a portion of the rotor and made of a metal material, wherein the first material is a metal material.

17. A rotor comprising:
    a monolithically formed rotor body defining:
        a central aperture;
        a plurality of lobes arranged helically about the central aperture formed from a first material, each of the plurality of lobes defining an internal cavity between an outer surface and the central aperture; and
        a coating formed by adding a second material onto the outer surface of the plurality of lobes, wherein the configuration of the second material comprises at least one of: 1) the same material as the first material; 2) a second material porosity that is higher than a first material porosity at which the first material is added; or 3) a matrix pattern onto the outer surface of the plurality of lobes.

18. A rotor assembly comprising:
    (a) a shaft extending along a longitudinal axis;
    (b) a plurality of lobes arranged helically about the shaft and being formed from a first material, each of the plurality of lobes defining an internal cavity between an outer surface and the shaft; and
    (c) a coating formed by adding a second material onto the outer surface of the plurality of lobes, wherein the configuration of the second material comprises at least one of: 1) the same material as the first material; 2) a second material porosity that is higher than a first material porosity at which the first material is added; or 3) a matrix pattern onto the outer surface of the plurality of lobes.

19. The rotor assembly of claim 18, wherein the plurality of lobes are integrally formed with the shaft.

20. The rotor assembly of claim 19, wherein the shaft is formed from the first material.

21. The rotor assembly of claim 20, wherein the first material is a metal material.

* * * * *